United States Patent Office 3,302,175

Patented Jan. 31, 1967

3,302,175

ATTENUATION NETWORK FOR CARRIER-CURRENT TELECOMMUNICATION SYSTEMS

Albert Deracinois, L'Hay-les-Roses, and Henri François Germain Lassaigne, Gometz-la-Ville, France Filed June 29, 1962, Ser. No. 206,291

Claims priority, application France, Nov. 14, 1961, 878,933

10 Claims. (Cl. 340—149)

This invention is concerned with the regulation of signal level at a given point in a telephonic communications line, i.e. it serves to compensate the variations in attenuation at this point, usually due to various causes such as fluctuation in the gain of line booster amplifiers.

In carrier signal type telephony systems, there generally exist:

(1) Temperature compensators situated at the end of each amplification section, whose function is to compensate for the influence exerted by temperature fluctuations on the attenuation of the line itself.

(2) Level regulators, the function of which is to compensate for residual variations in attenuation in the cable and for random variations in amplifier gain.

In the majority of level controls, regulation is effected by causing the speech signals and an auxiliary frequency signal, called the "pilot signal," to pass through a passive or active network having more or less constant input and output impedances and called the "control network." The attenuation of this network can be so varied that at its output terminals the pilot signal voltage and, consequently, that of each of the speech signals, returns to its nominal value, when the said pilot signal voltage at the input terminals varies. To this end, the pilot signal, after passing through the control network, is separated from the speech signals by a filter network and subsequently fed to a measuring instrument which compares its voltage value with that of a reference voltage. The error signal thus derived is fed into a control unit whose function it is to alter the variable elements in the control network in such a fashion that the total attenuation of the network is adjusted to cause the voltage at the output terminals to revert to the nominal value desired.

The devices of the invention belong to the class which makes use of a variable and controllable attenuation four-terminal network including so-called "indirectly-heated thermistors," i.e. variable resistance elements, the resistance value of which is controlled by the intensity of a control current passing through a heater element insulated from the variable resistance proper.

Level regulation devices of this class, applicable to carrier-current telephone systems, have already been described, for instance in the U.S. Patent Serial No. 2,345,066 to H. N. Nylund.

The main object of the invention is a controllable attenuation network including first and second pairs of terminals, at least a fixed resistor and at least an indirectly-heated thermistor, in which said thermistor (or thermistors), resistor (or resistors) and terminals are combined with a 1/1 turn ratio phase-reversing transformer having a common point to its primary and secondary windings. By a suitable arrangement of the just-mentioned elements, it is possible, as will be shown hereinbelow, to build a four-terminal network which would be balanced, i.e. which would have a zero transfer coefficient between its first and second terminal pairs, if the ratios of the resistances of its thermistors to those of its fixed resistors were given suitable values. In practice, the average resistances of the thermistors are adjusted, eventually by means of an auxiliary control current, at values for which the network has but a finite attenuation, but it will easily be understood that the balanceable nature of the network gives it an increased sensitivity with respect to the variations of its variable resistance elements.

Such an advantage would also exist, of course, in a lattice network, but the networks of the invention are much simpler and more economical since, as it will be shown later on, each one of their thermistors replaces two thermistors in a lattice network.

When they are applied to a carrier-current communication system, the networks of the invention, like those of the prior art which use indirectly-heated thermistors, have the heater elements of the latter submitted to a control current derived, in the case of such a system, from an error signal itself derived from a comparison between a rectified pilot signal voltage and a reference direct-current voltage.

A further object of the invention is to measure the precise overall attenuation introduced by the control network during operation. This is to enable precise monitoring of transmission conditions in the communication channels concerned, so that, if necessary, the triggering off of alarms, switching of control units or introduction of other measures, can be brought about.

This procedure is to be preferred to that in which the overall attenuation of the control network is deduced from the amplitude of the control current in a thermistor in the network, which is not accurate, since this control current is not solely a function of the overall attenuation. The reason for this is that the temperature of the thermistor depends both on the control current *and* the ambient temperature.

Another feature of the invention consequently is that the precise value of the overall attenuation of the control network is deduced from the instantaneous resistance of a thermistor in one of its arms, this resistance value being measured by inclusion in one of the arms of a Wheatstone bridge.

The invention will be better understood from the hereinafter given detailed description and from the annexed drawings, in which FIG. 1 is a diagram showing the disposition of a level control comprising a control network and a measuring circuit for determining the attenuation of this network, all in accordance with the invention.

FIGS. 2*a*, 2*b*, 2*c*, 2*d* are theoretical diagrams for explaining the performance of the circuits of the invention.

Figure 1:
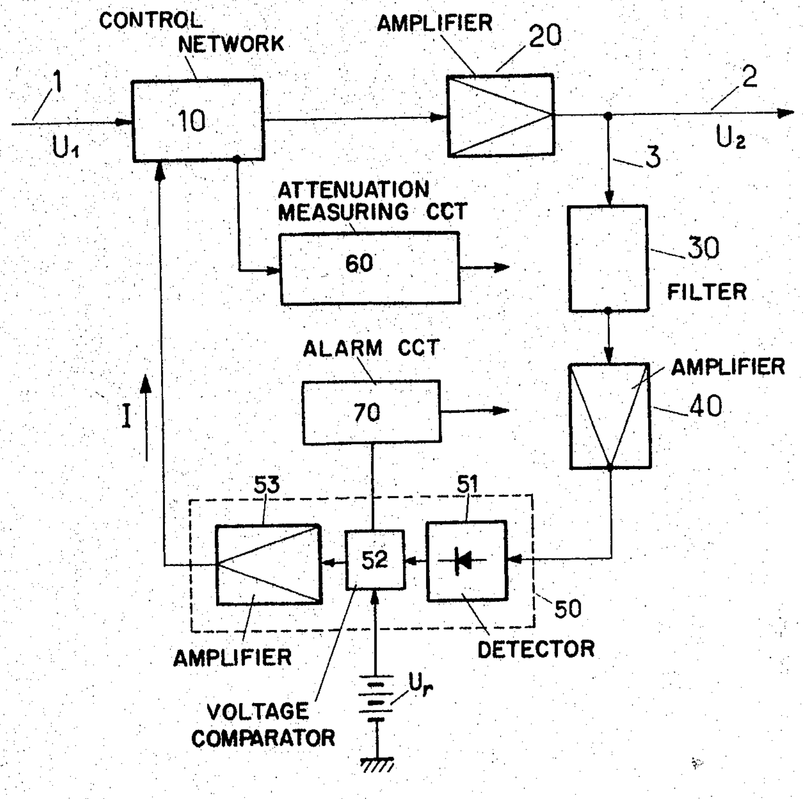

Referring now to FIG. 1, the control network 10 and an amplifier 20 are series connected in a telephonic communications line, labelled 1 at the input side and 2 at the output side. At the output from amplifier 20, the section 2 of the line has a tapping 3, feeding a filter network 30 which serves to detect the pilot signal frequency. The output from the filter network 30 is connected to an amplifier 40, feeding a control and measuring device 50, this device comprising a detector 51, an element 52 for comparing the output voltage from detector 51 with a reference voltage $U_r$ and a current amplifier 53. The output current from amplifier 53 is the control current for control network 10. The attenuation of this network is measured by the circuit 60 which can be expanded to include suitable alarm circuits as well. A further alarm, indicating that the pilot signal is absent, is given by a circuit 70 connected to the comparator device 52.

Figure 2A:
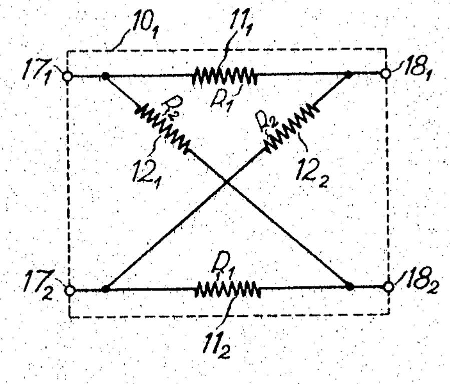

FIG. 2*a* represents a symmetrical network, with two pairs of terminals $17_1$, $17_2$ and $18_1$, $18_2$, called the "lattice network" and having two horizontal arms $11_1$ and $11_2$, comprising equal resistances $R_1$, as well as the two diagonal arms $12_1$ and $12_2$ containing equal resistances $R_2$.

It is known that:

(a) When such a passive network is fed from a source E.M.F. (E) of internal resistance R, this source being connected across the input terminals $17_1$ and $17_2$ so that across an identical resistance R connected between the output terminals $18_1$ and $18_2$, a voltage difference U appears, the overall network attenuation $b$, expressed in Nepers, is equivalent to the natural logarithm of E/2U, thus $$b=\log E/2U \qquad (1)$$

(b) For any given values of resistors $R_1$ and $R_2$, the overall attenuation of the lattice network 10 is expressed by the following relation:

$$\exp(-b)=\frac{1}{1+R_1/R}-\frac{1}{1+R_2/R} \qquad (2)$$

(c) If the resistances $R_1$ and $R_2$ of the same network are related by the following expression:

$$R=(R_1\times R_2)^{1/2} \qquad (3)$$

the overall attenuation $b$ can be calculated using the following hyperbolic expression:

$$\tanh(b/2)=(R_1/R_2)^{1/2} \qquad (4)$$

Consequently, if the values $b$ and R are given, the resistances $R_1$ and $R_2$ can be derived from the relations:

$$R_1=R\tanh(b/2) \qquad (5)$$

$$R_2=R\coth(b/2) \qquad (6)$$

Figure 2B:
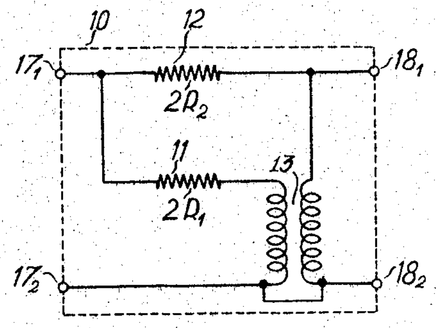
Figure 2C:
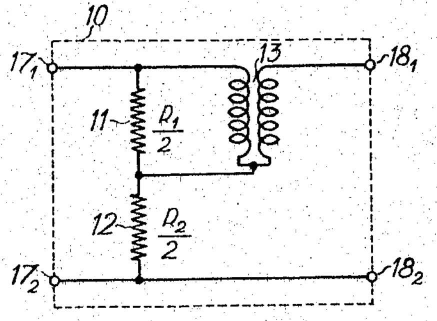
Figure 2D:
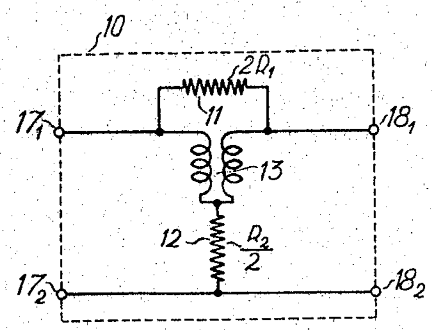

The FIGS. 2*b*, 2*c* and 2*d* represent three networks, each having two pairs of terminals, their similarity to the lattice network of FIG. 2*a*, for the quoted values of their resistances 11 and 12, being demonstrated by the work of Ernest A. Guillemin entitled "Communication Networks" (vol. II, pp. 160–161 and FIGS. 49 and 50 of the January 1947 edition) published by John Wiley & Sons, New York. The Formulae 1 to 6 above are therefore applicable to these equivalent networks if the values $2R_1$ and $2R_2$, $R_1/2$ and $R_2/2$, $2R_1$ and $R_2/2$ are given to their resistances 11 and 12 in FIGS. 2*b*, 2*c*, 2*d* respectively. The transformer 13 shown in each figure is a theoretically ideal transformer having a ratio of −1/1, the minus sign indicating that the windings are connected in series and opposed.

Figure 3:
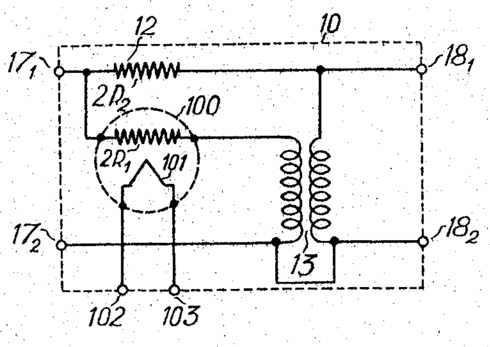
FIG. 3 is a simplified diagram of an actual circuit according to the invention.

FIG. 3, although by no means the only possible embodiment, represents a control network 10 in which the twin arm arrangement is that of FIG. 2*b*, one arm comprising a thermistor and the other a fixed resistance.

An examination of FIGS. 2*b* and 3, in which similar elements have similar notations, shows the resistor 11 to be represented by a thermistor 100 whose resistance varies in accordance with the filament current circulating through terminals 102 and 103 and filament 101.

Figure 4:
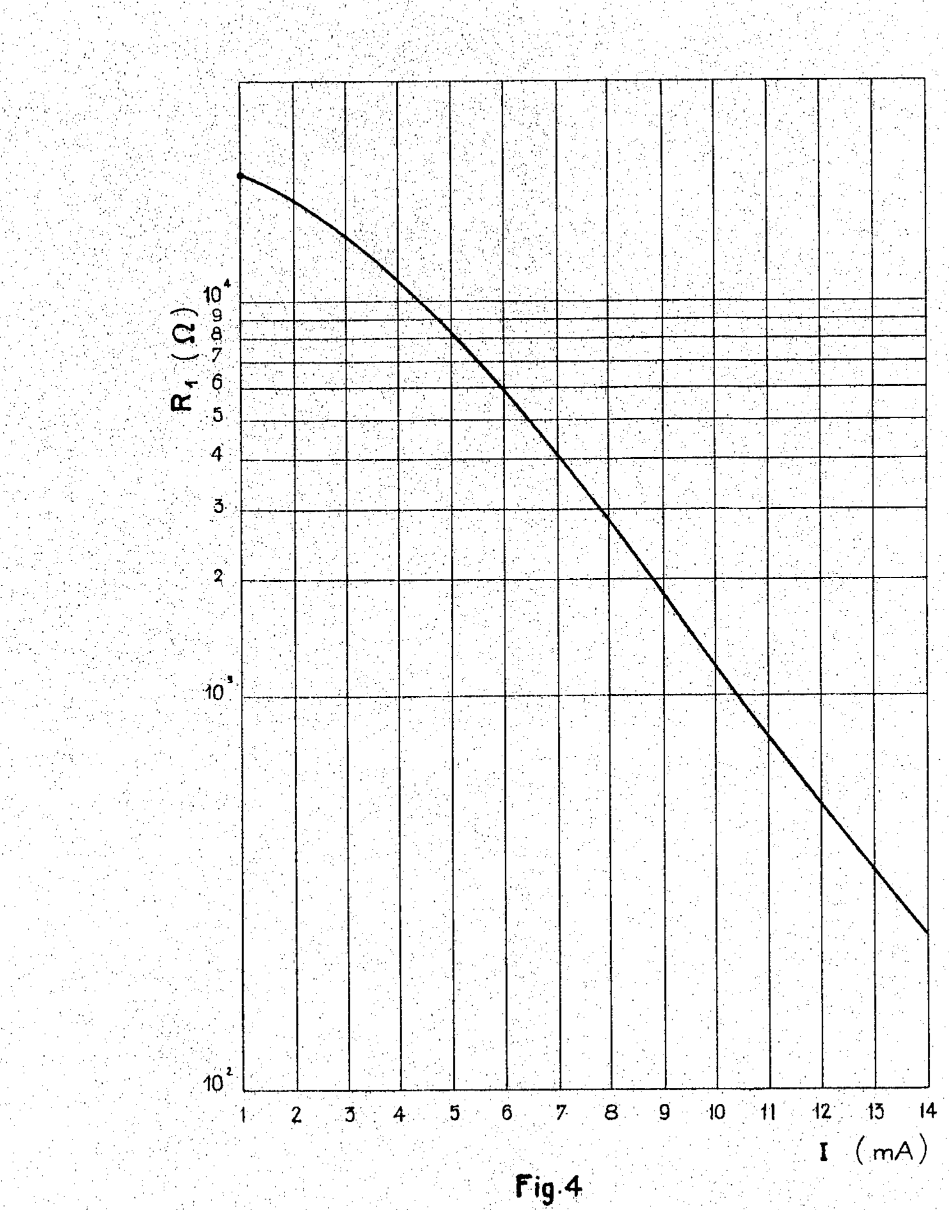
FIG. 4 is a graph showing the behavior of the resistance of the heated element of a thermistor as a function of the intensity of the heater current.

In order to fix some concept of the order of magnitude of the quantities involved, FIG. 4 shows the impedance presented to alternating signals by an indirectly heated thermistor for filament current values between 1 and 15 milliamperes.

In the working region, the differential resistance of the thermistor the curve of which is plotted in FIG. 4 can be expressed very approximately by an equation of the form C. exp (−KI), thus:

$$2R_1=7.8\times10^4\exp(-0.412\,I) \qquad (7)$$

$R_1$ being in ohms and I in milliamps.

The characteristics of the control network of FIG. 3 can be predetermined in the following manner, using the test curve of FIG. 4 and the Formulae 1 to 7 thus far cited.

Employing a control network incorporating only one thermistor has the drawback that the network presents to the telephonic communication line, an input impedance which does not remain constant when the thermistor resistance varies. Hence, in general, a reflection coefficient of 10% should not be exceeded throughout the whole control range, i.e., a range covering about ±0.4 Nepers from the average attenuation figure. Thus, it becomes necessary to seek out that condition which establishes the mean overall attenuation as a function of the mismatch ratio.

To do this we must determine:

(1) The order of magnitude of the reflection coefficient $\rho$ of the network under discussion, when the thermistor filament current varies by an amount ΔI, (2) The order of magnitude of the variation $\Delta b$ in the overall attenuation of this network for the same change ΔI in filament current, and, (3) By comparison of expressions for $\rho$ and $\Delta b$, the value of the overall attenuation $b$ required in the control network when the signal level has the nominal value.

As regards:

(1) *Coefficient of reflection.*—The reflection coefficient of a lattice network comprising resistances $R_1$ and $R_2$ and terminated in a resistance R, the input impedance being given by $$Z=\frac{R(R_1+R_2)+2R_1R_2}{R_1+R_2+2R}$$

is expressed by the following equation:

$$\rho=\frac{Z-R}{Z+R}=\frac{R_1R_2-R^2}{(R+R_1)(R+R_2)} \qquad (8)$$

At the nominal signal level, the reflection coefficient should be zero, requiring that Condition 3

$$R_1R_2=R^2$$

be satisfied. In other words, if, at the nominal signal level, the thermistor constituting the variable resistance in the lattice network has a value $R_{10}$, the resistance $R_2$, which remains constant, should be given by:

$$R_2=R^2/R_{10} \qquad (9)$$

Combining Equations 8 and 9, we obtain:

$$\rho=\frac{R_1/R-R_{10}/R}{(1+R_1/R)(1+R_{10}/R)} \qquad (10)$$

If we consider the variation $\Delta R_1=R_1-R_{10}$, of the thermistor resistance, to be negligibly small, the Formula 10 may be written:

$$\rho=\frac{R_1/R}{(1+R_{10}/R)^2} \qquad (11)$$

(2) *Variation in attenuation.*—If the variation ΔI in the thermistor filament current is supposed small, we can write, differentiating expression 2:

$$\Delta b=-\frac{\exp(b)}{(1+R_1/R)^2}\cdot\frac{\Delta R_1}{R} \qquad (12)$$

If, as in expression (11), we take $R_1\approx R_{10}$, we obtain:

$$\Delta b=-\frac{\exp(b)}{(1+R_{10}/R)^2}\cdot\frac{\Delta R_1}{R} \qquad (13)$$

(3) *Mean attenuation.*—Combining Formulae 11 and 13 gives us:

$$\exp(b)=\Delta b/\rho \qquad (14)$$

whence, if $b=0.45$ Nepers and $\rho=0.1$; $\exp(b)=4.5$, i.e., $b$ is slightly less than 1.5 Nepers.

The working point on curve 4 is taken in the linear region, bearing in mind the conditions relating to the choice of the value $I_0$ corresponding to the nominal attenuation $b_0$. In the embodiment described, the value of $I_0$ is 9.5 milliamps.

Substituting this in Formula 7, we obtain:

$$2R_{10}=1548 \text{ ohms.} \qquad R_{10}=774 \text{ ohms.}$$

If we let the overall attenuation of the control network 10 be 1.5 Nepers at the nominal signal level, and if, in addition, Condition 3 is fulfilled, $R=(R_{10}\times R_2)^{1/2}$, the fixed resistance $R_2$ in the network will be expressed by:

$$R_2=\frac{R_{10}}{\tanh^2(b/2)} \qquad \text{(Formula (4))}$$

giving:

$$R_2=305.5 \text{ ohms.} \qquad 2R_2=611 \text{ ohms.}$$

The input and output impedances of the control network at the nominal signal level, are thus given by:

$$R=(774\times 305.5)^{1/2}=491.5 \text{ ohms.}$$

The essential elements in the control network 10 are now known and experience has shown that no appreciable error is introduced if the resistance 12 has a value $2R_2=600$ ohms and the characteristic impedance of the network a value $R=500$ ohms.

Looking at FIG. 1, it can be seen that the variation $\Delta I$ in the filament current is proportional to the pilot signal voltage $U_2$ at the output 2 from amplifier 20. If, in Equation 13, we substitute $$R_1=C\exp(-KI) \qquad (7)$$

where C and K are constants and $$\exp(b)=\frac{1+\tanh(b/2)}{1-\tanh(b/2)}=\frac{1+R_{10}/R}{1-R_{10}/R} \qquad (15)$$

we can write, after simplification:

$$\Delta b=\frac{K}{R_{10}/R-R/R_{10}} \qquad (16)$$

i.e.

$$\Delta b=H.I.$$

H being a constant associated with the thermistor 100 in network 10.

The efficiency of control can therefore be calculated in the characteristics of the feedback circuit are known. If a variation $\Delta U_2$ in the output voltage $U_2$ causes a change in the control current of $G\Delta I$, we can write:

$$\Delta U_2/U_2=\Delta U_1/U_1\cdot\frac{1}{1+H.G.U_2}$$

Thus, we have a variation in the input voltage $U_1$ divided by the factor $(1+HGU_2)$, this being considerably greater than unity.

In the example quoted, $H=0.44$ and $GU_{20}=90$, whence $$\Delta U_2/U_2=(\Delta U_1/U_1)/40$$

Figure 5:
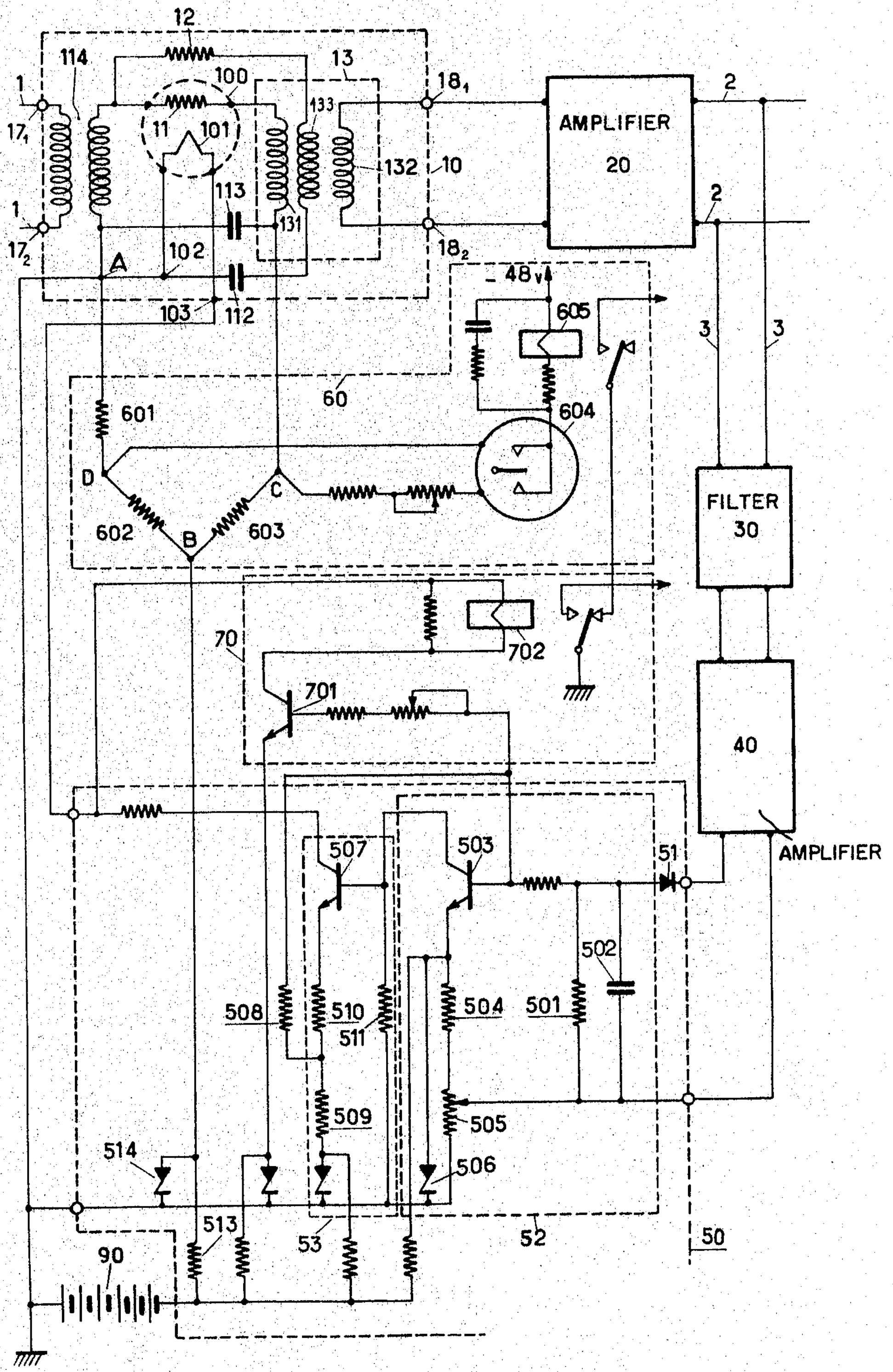
FIG. 5 is a more elaborated diagram of a regulating circuit according to the invention, including an alarm device operated when the level of the signal to be regulated no longer remains between certain preassigned limits.

FIG. 5 shows the circuit diagram of a level control system as described in FIG. 1, including the control network 10 itself, the measuring circuit 60 with the associated alarm circuit, as well as the control and measuring device 50 and the accompanying alarm circuit 70.

The sub-units 30, 20 and 40 have already been encountered, the former being the filter and the others amplifiers.

The diagram of the control network 10, contains more elements than FIG. 3 indicates, the function of these will now be elucidated.

The transformers 114 and 13, are for the purpose of matching the input and output impedances of the control network 10 when the latter is adjusted to the nominal value. In order to enable resistance 11 to be included in a bridge circuit ABCD, operating on a D.C. supply, without risk of interference to the control network 10 and consequently to telephonic transmission, the transformer 13, represented as having two windings in FIG. 3, is provided with three windings 131, 132 and 133. The secondary winding 132 separates the output of network 10 from the input of amplifier 20 as far as D.C. is concerned and the output ends of windings 131 and 133 are connected to earth via two condensers 113 and 112 respectively. The bridge ABCD, having in its remaining three arms the resistances 601, 602 and 603, is fed across points A and B by a D.C. voltage, drawn from source 90 and stabilized by Zener diode 514.

The measuring and control unit 50 comprises a diode 51, a voltage comparator 52 and an amplifier 53.

The pilot signal issuing from amplifier 40 is detected by the standard (19P1) diode 51 and the resulting D.C. voltage appears in the voltage comparator, across the terminals of a resistor 501 shunted by a condenser 502. This voltage is applied to the base of a transistor 503 which has applied to its emitter a direct-current voltage obtained from the direct-current source 90. This reference voltage is tapped off from a voltage divider constituted by resistances 504 and 505, the latter of which is used to set the desired value, and is maintained constant by a Zener diode which shunts these two resistances.

The error signal already amplified by the transistor 503 is applied to amplifier 53 which constitutes a transistor 507, the base of which is connected on the one hand to the collector of transistor 503 and on the other hand to earth via a resistance 511. The emitter of this same transistor (507) is connected to the base of transistor 503 via the chain of resistances 508, 509 and 510. From its collector circuit, transistor 507 provides a current which supplies the filament 101 of thermistor 100 in control network 10.

The current amplification, i.e. the ratio of the base current of transistor 503 to the collector current of transistor 507, is fixed by the constant ratio between resistances 508 and 509 and is more or less independent of the gain of the two transistors 503 and 507.

The variable resistance 11 comprised by the thermistor 100, forms the arm A.C. in the Wheatstone bridge ABCD. Across the diagonal AB is applied a D.C. voltage U, taken from the terminals of a Zener diode 514 connected in series with a resistance 513 across source 90. The D.C. voltage $u$ which appears across the terminals C and D of the other diagonal, is applied to a galvanometric relay 604 via either control resistances or a D.C. amplifier. By suitable choice of the values of resistances 601, 602 and 603, the galvanometric relay 604 can be calibrated directly in terms of the change in overall attenuation $\Delta b$ around a central zero. The relay 604 has two stop pins at points in its range of movement corresponding to the particular range to be read, e.g. $\pm 0.4$ Nepers. When the relay needle encounters one of these pins, the electrical contact thus made closes the circuit of an electromechanical relay 605 which actuates an alarm preventing the given limits from being exceeded.

A further alarm device 70 can be provided in order to indicate the absence of the pilot signal. This device can be made, using an electromechanical relay 702 connected in the collector circuit of a transistor 701, the base of which has a common connection with the base of transistor 503 in comparator 52, and whose emitter is maintained at a constant voltage by a Zener diode in series with a resistance across source 90.

The value of resistance 11 of thermistor 100 being $2R_1$, the value P of resistance 601 and the values W of resistances 602 and 603 are obtained from the following relations.

From the arrangement ACB in bridge ABCD, we can write:

$$\frac{U}{2R_1+W}=\frac{V_A-V_C}{2R_1}=\frac{V_C-V_B}{W}$$

whence, $$V_A-V_C=U.2R_1(2R_1+W)$$

and for the arrangement ADB, we can write:

$$\frac{U}{P+W}=\frac{V_A-V_D}{P}=\frac{V_D-V_B}{W}$$

whence, $$V_A-V_D=U.P/(P+W)$$

from which we obtain:

$$V_C-V_D=u=\left[\frac{P}{P+W}-\frac{2R_1}{2R_1+W}\right]U$$

and this can again be put in the form:

$$u/U=\frac{1}{1+2R_1/W}-\frac{1}{1+P/W} \quad (18)$$

If we give P the value $2R_{10}$ of the thermistor 100 resistance 11 when the signal level at the input to control network 10 has its nominal value, and if we give W the value 2R, i.e. if each of the resistances 602 and 603 is double the characteristic impedance of control network 10 when the signal level has its nominal value, then the Relation 18 becomes:

$$u/U=\frac{1}{1+R_1/R}-\frac{1}{1+R_{10}/R} \quad (19)$$

From Equations 2 and 3, the overall attenuation $b_0$, at nominal signal level, is given by:

$$\exp(-b_0)=\frac{1}{1+R_{10}/R}-\frac{1}{1+R/R_{10}} \quad (20)$$

The addition, term for term, of the Equations 19 and 20 gives us:

$$u/U+\exp(b_0)=\frac{1}{1+R_1/R}-\frac{1}{1+R/R_{10}} \quad (21)$$

The second term of expression (21) is simply $\exp(-b)$, $b$ being the overall attenuation of control network 10 at any signal level. Thus we have:

$$u/\mathrm{U}+\exp(b_0)=\exp(-b) \quad (22)$$

Multiplying the two sides of Equation 22 by $\exp(+b_0)$ we obtain:

$$\exp(b_0-b)=1+\frac{u}{U}\cdot\exp(-b_0)$$

If $b-b_0=\Delta b$ is sufficiently small, we can write:

$$\Delta b\approx\exp(b_0\cdot u/\mathrm{U}$$

i.e.

$$u=\Delta b\cdot U\exp(b_0) \quad (23)$$

The voltage appearing at terminals C and D of the bridge ABCD is not only directed, by Equation 23, to the variation in attenuation $\Delta b$ of control network 10 but is also essentialy linear in the working range.

Figure 6:
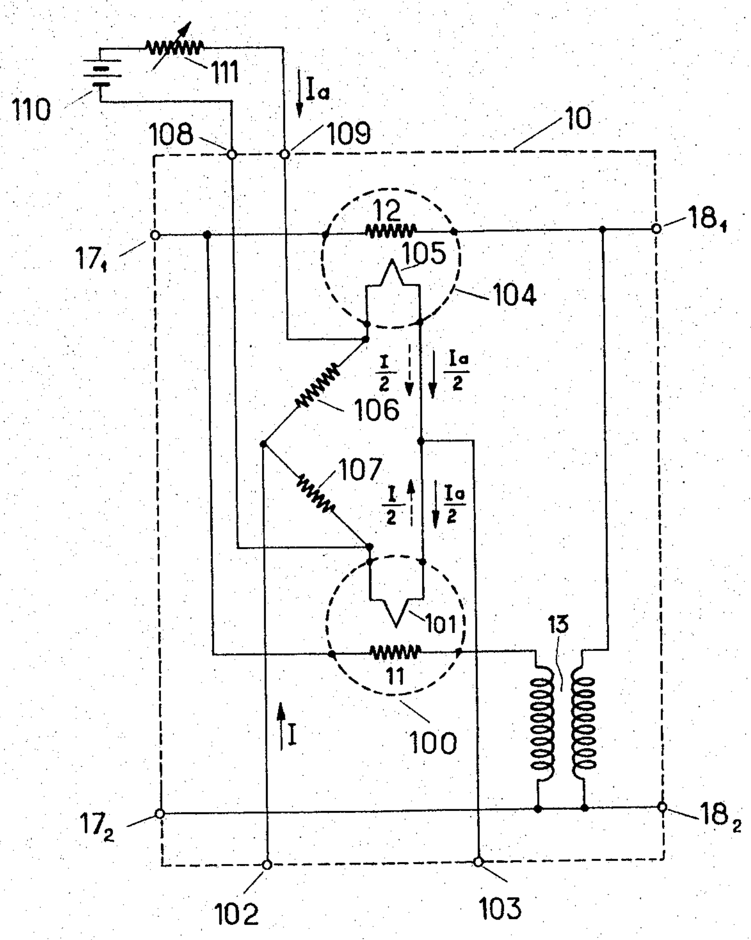
FIG. 6 shows a balanced circuit according to the invention, including two thermistors symmetrically connected in bridge fashion.

FIG. 6 shows a second manner in which a control network 10 can be realized. In this case the twin arm structure of FIG. 2*b* is used, each of the two arms comprising a thermistor: by this means, highly stable input and output impedances can be obtained.

Those elements in FIG. 6 which are duplicated in FIG. 3 are given similar designations.

The thermistors 100 and 104 are assumed to have identical electrical characteristics. Their filaments 101 and 105, of identical resistance, are connected in series with two resistances 106 and 107 having identical values, thus forming a bridge arrangement. One of the diagonals of this bridge is connected across the terminals 102 and 103 at which the error current I appears. The other diagonal of the bridge is connected across the terminals 108 and 109 at which a constant auxiliary current $I_a$ is present, this current being drawn from a D.C. source 110 whose output is regulated by a resistance 111. Through the filament 105 of thermistor 104 passes a current $(I+I_a)/2$ and through the filament 101 of thermistor 100 a current of $(I-I_a)/2$.

Thus, the values of the arms 11 and 12 are given by:

$$2R_1=C\ \exp[-K/2)(I-I_a)]$$
$$2R_2=C\ \exp[-(K/2)(I+I_a)]$$

where C and K are constants.

The input and output impedances R of the network are given by the expression:

$$R=(R_1\times R_2)^{1/2}=\frac{C}{2}\exp\left[-\frac{K}{2}\cdot I_a\right]$$

The resistance R is constant, regardless of the error current I, but can be varied by the auxiliary current $I_a$.

The overall attenuation $b$ can be calculated from Equation 4, thus:

$$\tanh b/2=(R_1/R_2)^{1/2}=\exp\left[-\frac{K}{2}\cdot I\right]$$

Likewise, we may write:

$$\exp(b)=\frac{1+\tanh(b/2)}{1-\tanh(b/2)}=\frac{1+\exp(-K/2.I)}{1-\exp(-K/2.I)}$$

$$\exp(b)=\coth(\mathrm{KI}/4)$$

Thus, the arrangement of FIG. 6 yields certain advantages in respect of that of FIG. 3. However, extreme care in choosing the thermistors is required and an auxiliary current source must be employed.

Figure 7:
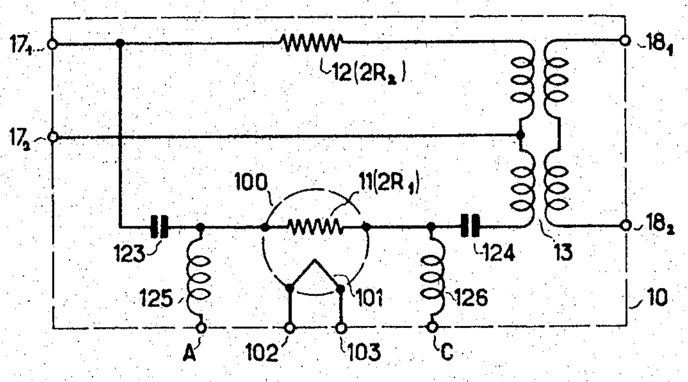
FIGS. 7, 8 and 9 show various arrangements of circuits according to the invention, each including one thermistor.

FIG. 7 shows a variant form of the control network 10 of FIG. 3, based on the same twin arm structure exhibited in FIG. 2*b*, where one arm comprises a thermistor and the other a fixed resistance. In FIG. 7, besides the elements common to FIG. 3, and carrying the same designations, there are two condensers 123 and 124 as well as two inductors 125 and 126. These allow the thermistor 100 resistance 11 to be included in the arm AC of the Wheatstone bridge ABCD represented in FIG. 5, without risk of interference to the functioning of control network 10.

Figure 8:
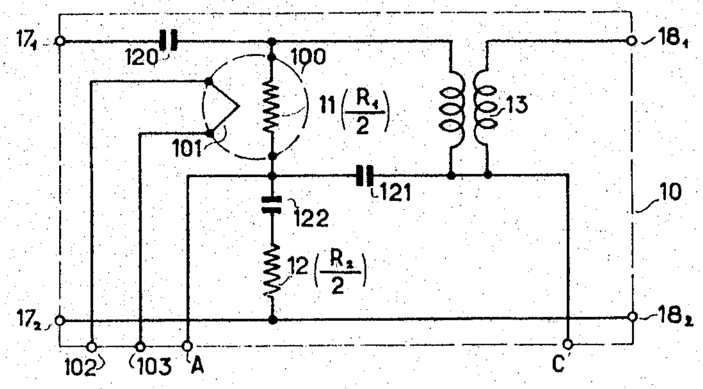

FIG. 8 represents a control network 10 in which the twin arm structure is that of FIG. 2*c*, where the resistances 11 and 12 have the values $R_1/2$ and $R_2/2$ respectively. Consequently, if this network incorporates a thermistor 100 having the same characteristics as those in the networks 10 represented in FIGS. 3 and 5, its impedance will be four times higher. In order to be able to include the thermistor 100 resistance 11 in the arm AC of the bridge ABCD shown in FIG. 5, without disturbing the functioning of the network, all that is necessary is to provide the network with three condensers 120, 121 and 122 as indicated in FIG. 8.

Figure 9:
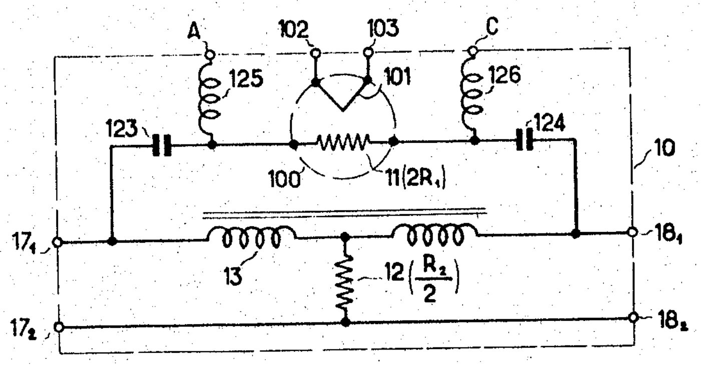

FIG. 9 represents a control network 10, in which the twin arm structure is that of FIG. 2*d* and in which the resistances 11 and 12 have the values $2R_1$ and $R_2/2$ respectively. In this case, the use of a thermistor 100 having the same characteristics as those of the networks in FIGS. 3 and 5 yields a slightly lower characteristic impedance. For the introduction of the thermistor 100 resistance 11 in the arm AC of bridge ABCD depicted in FIG. 5, two condensers 123 and 124 and two inductors 125 and 126 should be used, as demonstrated in FIG. 7.

What is claimed is:

1. A controllable attenuation network having first and second terminal pairs each including first and second terminals, said network comprising a thermistor having a heater and a heated element, a pair of control terminals connected to said heater, a fixed resistor, and a 1/1 turn ratio transformer having a first and a second winding, said windings each having a non-common end and a common end constituting a common point wherethrough said windings are connected in series and phase opposition; said network further comprising connection means between said terminal pairs, thermistor, resistor and transformer; said connection means consisting of said fixed resistor connected between said first terminals of said first and second terminal pairs, said heated element of said thermistor connected between said first terminal of said first terminal pair and the non-common end of said first winding, a connection between the non-common end of said second winding and said first terminal of said second terminal pair, and a direct connection linking said second terminals of said first and second terminal pairs and said common point.

2. A controllable attenuation network having first and second terminal pairs each including first and second terminals, said-network comprising a thermistor having a heater and a heated element, a pair of control terminals connected to said heater, a fixed resistor, and a 1/1 turn ratio transformer having a first and a second winding, said windings each having a non-common end and a common end constituting a common point wherethrough said windings are connected in series and phase opposition; said network further comprising connection means between said terminal pairs, thermistor, resistor and transformer; said connection means consisting of first connections by which said heated element is shunted across said first winding, a second connection between said first terminal of said first terminal pair and said non-common end of said first winding, a third connection between said non-common end of said second winding and said first terminal of said second terminal pair, a direct connection between said second terminals of said second terminal pair, and a fourth connection including said resistor between said common point and both latter said second terminals.

3. A controllable attenuation network having first and second terminal pairs each including first and second terminals, said-network comprising a thermistor having a heater and a heated element, a pair of control terminals connected to said heater, a fixed resistor, and a 1/1 turn ratio transformer having a first and a second winding, said windings each having a non-common end and a common end constituting a common point wherethrough said windings are connected in series and phase opposition; said network further comprising connection means between said terminal pairs, thermistor, resistor and transformer; said connection means consisting of connections respectively connecting said non-common ends of said first and second windings to said first terminals of said first and second terminal pairs, further connections respectively linking said non-common ends to one and the other end of said heater element, and a direct connection between said second terminals of said first and second terminal pairs, said resistor connecting said common point with both latter said second terminals.

4. A controllable attenuation network as claimed in claim 2, in which series capacitors are inserted in said first, second and fourth connections, whereby an auxiliary control current may be applied to said heated element through a pair of auxiliary control terminals.

5. A controllable attenuation network as claimed in claim 3, in which series capacitors are inserted in at least part of said connections, whereby an auxiliary control current may be applied to said heated element through a pair of auxiliary control terminals.

6. A controllable attenuation network having first and second terminal pairs each including first and second terminals, said network comprising a thermistor having a heater and a heated element, a pair of control terminals connected to said heater, a fixed resistor, and a 1/1 turn ratio transformer having a first and a second winding, said windings each having a non-common end and a common end constituting a common point wherethrough said windings are connected in series and phase opposition; said network further comprising connection means between said terminal pairs, thermistor, resistor and transformer; said connection means consisting of said fixed resistor connecting said non-common end of said first winding with said first terminal of said first terminal pair, a direct connection between said second terminal of said first terminal pair and said common point, and a circuit including said heated element and connecting said non-common end of said second winding with said first terminal of said first terminal pair; said transformer including a third winding connected across said second terminal pair.

7. A controllable attenuation network as claimed in claim 6, in which said circuit includes series-connected capacitors, whereby an auxiliary control current may be applied to said heated element through a pair of auxiliary control terminals.

8. A controllable attenuation network having first and second terminal pairs each including first and second terminals, said network comprising first and second thermistors each having a heater and a heated element, means for applying different control currents to the heaters of said thermistors, and a 1/1 turn ratio transformer having a first and a second winding, said windings each having a non-common end and a common end constituting a common point wherethrough said windings are connected in series and phase opposition; said network further comprising connection means between said terminal pairs, heated elements of said thermistors and said transformer; and said connection means comprising the heated element of said first thermistor connected between said first terminals of said first and second terminal pairs, the heated element of said second thermistor connected between said first terminal of said first terminal pair, and the non-common end of said first winding, a connection between the non-common end of said second winding and said first terminal of said second terminal pair, and a low impedance connection between said common point and both said second terminals of said first and second terminal pairs.

9. A controllable attenuation network as claimed in claim 8, in which said means for applying different control currents to the heaters of said thermistors comprise a Wheatstone bridge arrangement including said heaters and a pair of auxiliary resistors, and in which a main control current from a pair of control terminals is applied to one diagonal of said bridge, while an auxiliary control current from an auxiliary control current source is applied to the other diagonal of said bridge, whereby said main and auxiliary control currents combine additively in one of said heaters and subtractively in the other of said heaters.

10. A controllable attenuation network as claimed in claim 1, in which an auxiliary control current is applied to the heated element of said thermistor from an auxiliary current source through a Wheatstone bridge arrangement including three auxiliary resistors, and in which an alarm device is controlled from the voltage across a diagonal of said bridge.

References Cited by the Examiner

UNITED STATES PATENTS

| | | | |
|---|---|---|---|
| 2,345,066 | 3/1944 | Nylund | 179—170 |
| 2,660,625 | 11/1953 | Harrison | 179—170 |
| 2,752,571 | 6/1956 | Terroni | 179—170 |
| 2,758,281 | 8/1956 | Carleson | 179—170 |

NEIL C. READ, *Primary Examiner.*

L. HOFFMAN, H. PITTS, *Assistant Examiners.*